United States Patent [19]

Naruse

[11] Patent Number: 4,674,073

[45] Date of Patent: Jun. 16, 1987

[54] REFLECTIVE OBJECT DETECTING APPARATUS

[75] Inventor: Yoshihiro Naruse, Tokyo, Japan

[73] Assignee: Aisin Seiki Kabushiki Kaisha, Aichi, Japan

[21] Appl. No.: 835,005

[22] Filed: Feb. 28, 1986

[30] Foreign Application Priority Data

Feb. 28, 1985 [JP] Japan .............................. 60-28337[U]
Mar. 1, 1985 [JP] Japan .............................. 60-40860

[51] Int. Cl.$^4$ ............................................. G01S 15/93
[52] U.S. Cl. .................................... 367/105; 340/904; 367/108; 367/909
[58] Field of Search ............... 367/140, 163, 174, 909, 367/99, 105, 107, 108; 340/904

[56] References Cited

U.S. PATENT DOCUMENTS

| | | | |
|---|---|---|---|
| 2,797,399 | 6/1957 | Camp et al. ........................ | 367/163 |
| 4,240,152 | 12/1980 | Duncan et al. ..................... | 367/108 |
| 4,278,962 | 7/1981 | Lin ...................................... | 367/909 |
| 4,490,716 | 12/1984 | Tsuda et al. ....................... | 367/909 |

*Primary Examiner*—Richard A. Farley
*Attorney, Agent, or Firm*—Sughrue, Mion, Zinn, Macpeak & Seas

[57] ABSTRACT

A plurality of ultrasonic transmitting elements and ultrasonic receiving elements are provided and are electrically switched in a sequential manner to change a region over which the existence of an object is to be detected, thus allowing the existence of an object to be detected over an extended range. The distance to the object and a particular region in which it is detected are displayed. The ultrasonic transmitting elements and the ultrasonic receiving elements are alternately disposed in a linear array. When switching the region over which the existence of an object is to be detected, the switching of the ultrasonic transmitting elements takes place in an alternate fashion with the switching of the ultrasonic receiving elements, thus changing the region at an interval corresponding to one pitch with which the elements are disposed in the array.

8 Claims, 30 Drawing Figures

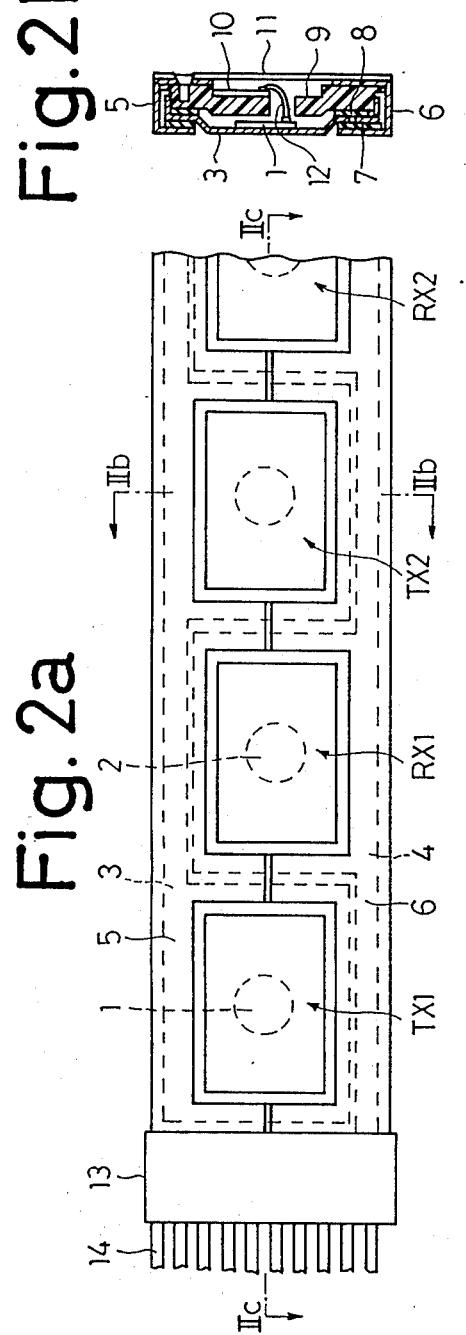

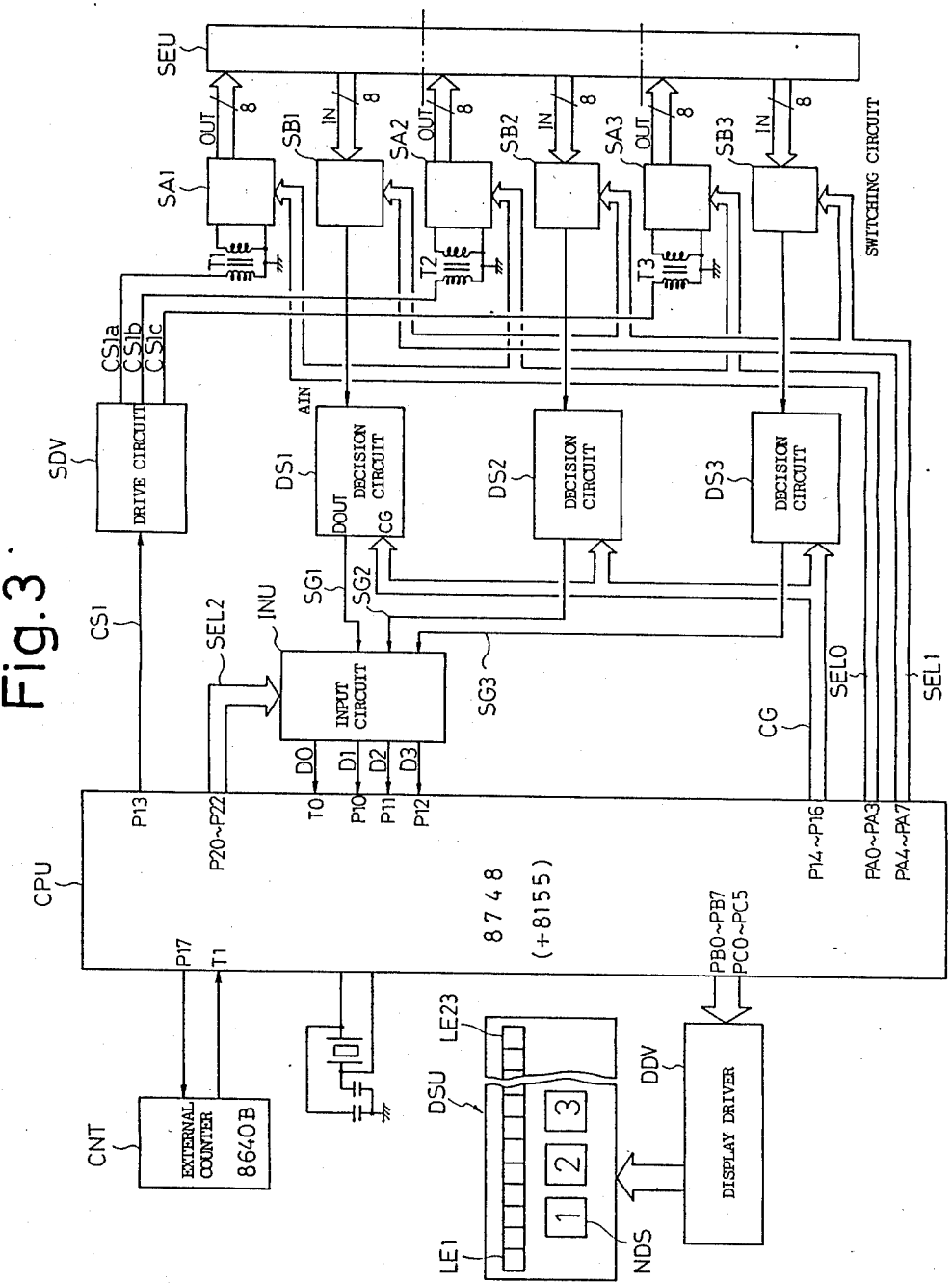

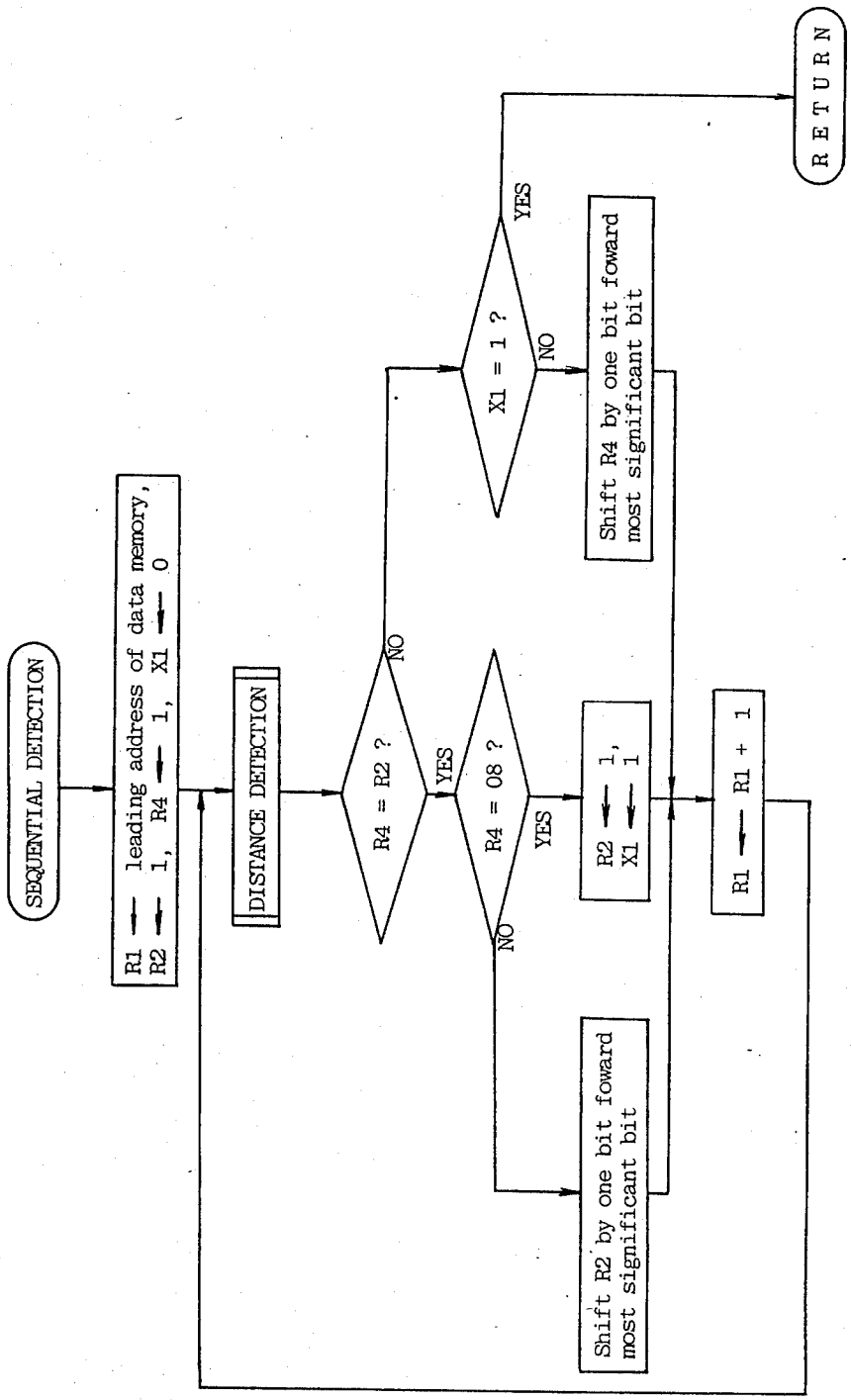

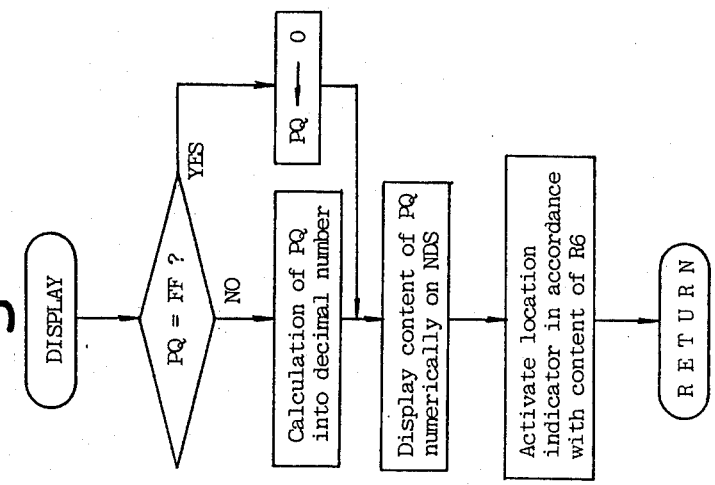
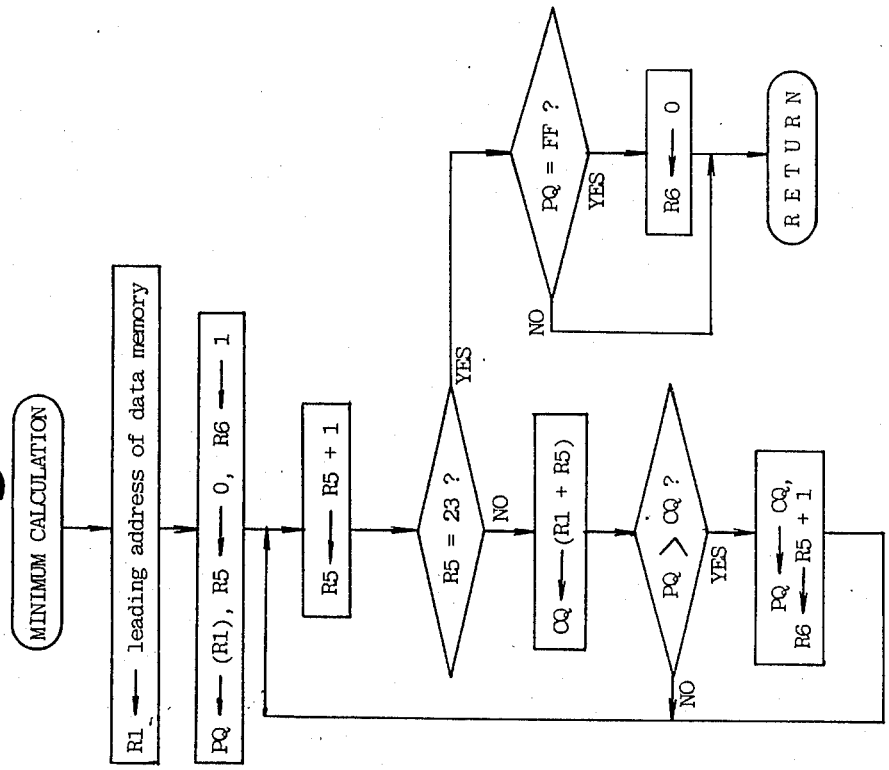

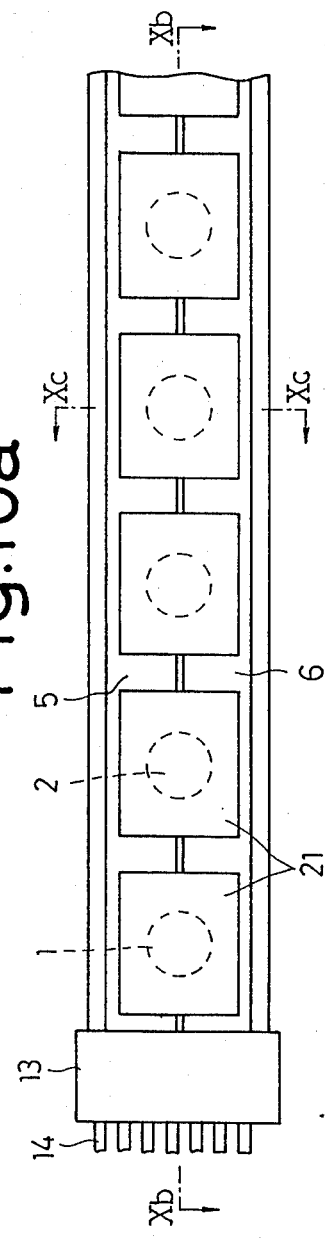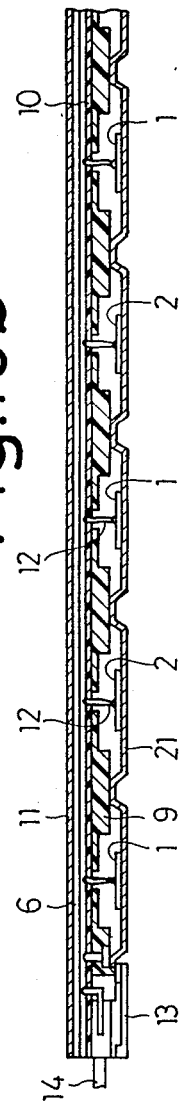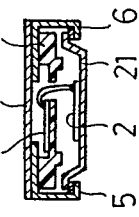

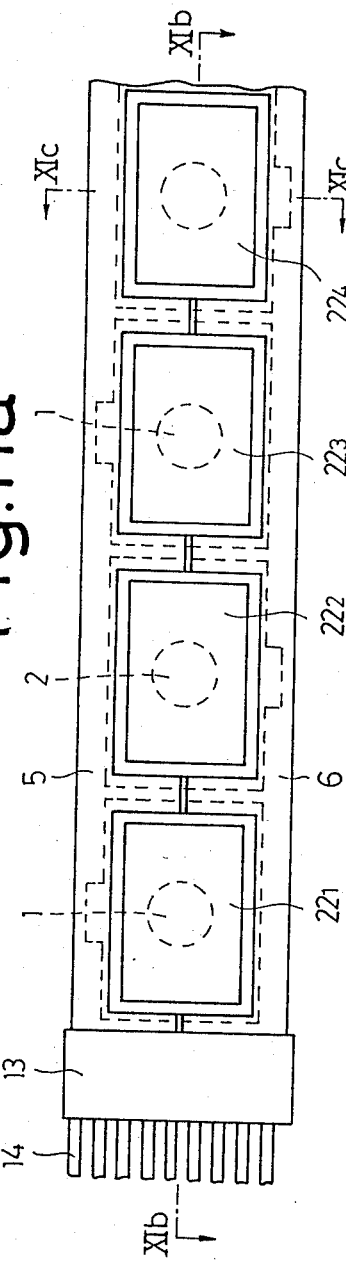

4,674,073

REFLECTIVE OBJECT DETECTING APPARATUS

BACKGROUND OF THE INVENTION

The invention relates to a reflective object detecting apparatus which utilizes ultrasonic waves, and in particular, to such apparatus in which a plurality of detectors are selectively changed for purpose of detection.

In the field of vehicles, for example, an ultrasonic object detector is known which assists in guiding a driver by allowing him to be aware of an obstacle which is located out of the field of sight of the driver. Usually, such detector comprises an ultrasonic transmitter and an ultrasonic receiver which are disposed in close proximity to each other. Since the ultrasonic wave exhibits a sharp directivity, such detector is generally only capable of detecting objects located within a specified narrow range.

To overcome such limitation, there is proposed a detector which provides an increased spacing between the transmitter and the receiver to extend the range over which the detection is made possible, or an apparatus including a mechanical drive associated with a detector so that the directivity of the entire apparatus can be changed, thus extending the range over which the detection is possible.

However, where there is an increased spacing between the transmitter and receiver, the distance of transmission of the ultrasonic wave varies depending on the location or orientation of the object even though the actual distance between the detector and the object remains the same, causing an error of an increased magnitude in the detection of the distance. In addition, this arrangement does not permit the direction or orientation in which the object is located to be determined. Where a detectors is associated with the mechanical drive, the provision of the drive increases the size of the detector, rendering the mounting of the detector on the vehicle difficult. In addition, this arrangement requires a relatively long time to perform a mechanical scan, resulting in an increased length of time from the beginning of the detection until the termination of the detection. Since an object or objects located at short distances are to be detected for a vehicle, for example, an output of measurement or the response tends to be too slow unless the vehicle moves very slowly.

It will be appreciated that an ultrasonic detector requires a transducer which converts an electrical signal into an ultrasonic wave or converts an ultrasonic wave into an electrical signal. Most detectors which are available in the prior art are specially designed to allow only the detection, and hence there is no problem involved with the space requirement for the provision of the transducer.

However, for an obstacle detector which is designed for automobile use, the location may be limited depending on the construction of a transducer. By way of example, where conventional ultrasonic elements A, B and C are simply juxtaposed on a support member D as illustrated in FIG. 16, the transducer will have a thickness on the order of several centimeters and hence cannot be disposed on a lateral side of an automobile. If such disposition is allowed, there exists a protuberance, which degrades the appearance of the autombile. Obviously, if the transducer is initially designed to be embedded into a car body, the use of such thick detector on the side of the automobile is allowed. However, an obstacle detector of embedded type cannot be offered as an option, nor can its location be altered according to the preference of a user.

SUMMARY OF THE INVENTION

It is a first object of the invention to provide an object detecting apparatus which monitors a broad region in a reduced time interval and is capable of providing accurate information relating to the location of and the distance to an object.

It is a second object of the invention to provide a thin ultrasonic transducer which can be mounted on a lateral side of an automobile.

The first object is achieved in accordance with the invention by providing a plurality of ultrasonic detectors which are electrically switched in a sequential manner so as to be selectively used in detecting the existence of an object. If each of the detectors is only capable of detecting in a limited range, an array comprising the plurality of detectors which are spaced from each other by a distance which is comparable to the detectable range of each detector may be used to provide a broad region as a whole in which the existence of an object can be detected. Obviously, where an object in a particular local region need be detected, a single detector may be associated with each region in which the detection is desired. In this manner, the need for the provision of a mechanical drive in order to change the location of a transducer can be disposed with, and the time length required for the detection is reduced since all of the detectors can be electrically scanned. This avoids an increased spacing between the ultrasonic transmitter and the ultrasonic receiver, preventing an error of an increased magnitude from being produced depending on the location of the object or the orientation of the object relative to the detector. It will be understood that a number of ultrasonic detectors must be used in order to derive accurate positional information. Specifically, to derive information relating to N locations, there must be provided N detector units, including N ultrasonic transmitting elements and N ultrasonic receiving elements.

In a preferred embodiment of the invention, ultrasonic transmitting elements and ultrasonic receiving elements are alternately arranged in a linear array, substantially at an equal spacing, and the particular ultrasonic transmitting and receiving elements used are switched in an alternate fashion. Specifically, every transmitting element and receiving element except the two which are located at the terminal ends of the array can be utilized in deriving information relating to two locations as a combination such as a first transmitting element and a first receiving element, a second transmitting element and the first receiving element, the second transmitting element and a second receiving element, a third transmitting element and the second receiving element and so on. In this manner, by using N transmitting elements and N receiving elements, information relating to (2N−1) locations can be derived.

It is understood that the use of an increased number of detector elements results in an increased cost for the manufacturing of the apparatus. If parts are used in common by a plurality of detector elements, an oscillation from a particular oscillating element may be transmitted through such parts to a receiving element directly, giving rise to the likelihood of an erroneous detection. Accordingly, in the preferred embodiment of the invention, a first oscillating diaphragm is disposed in contact with a plurality of transmitting elements in common, only one of which is selected at any one time, and a second oscillating diaphragm is disposed in contact with a plurality of receiving elements in common, with an elastic member disposed between the both diaphragms to support them, thus achieving a separation which prevents the transmission of oscillation therebetween.

In the preferred embodiment, there is provided a substrate in which a plurality of through holes are formed. An ultrasonic transmitting element or an ultrasonic receiving element, which is sized to be received within each of the holes is provided, thereby constructing a detector unit. An elastic member such as silicone rubber, for example, may fill the space between the internal wall of the hole and its associated element, thus supporting either element. An electrical wiring which is used for connection of each element with the external circuit is disposed laterally of either ultrasonic transmitting or receiving element, or offset from its associated element in a direction orthogonal to the direction of oscillation of the element. With this arrangement, each of ultrasonic transmitting and receiving elements are laterally supported and their associated wiring is taken from the lateral side thereof, so that the thickness of the entire ultrasonic assembly can be reduced to the minimum value which is required for each ultrasonic transmitting or receiving element.

Other objects and features of the invention will become apparent from the following description of several embodiments thereof with reference to the drawings.

BRIEF DESCRIPTION OF THE DRAWINGS

FIGS. 2a, 2b and 2c are a plan view, a section taken along the line IIb—IIb shown in FIG. 2a and a section taken along the line IIc—IIc shown in FIG. 2a, of part of a detector unit mounted on the automobile shown in FIG. 1;

FIG. 3 is a block diagram of the electrical circuit of an object detecting apparatus mounted on the automobile of FIG. 1;

FIGS. 9a, 9b, 9c, 9d, 9e, 9f and 9g are flowcharts illustrating the operation of a microcomputer shown in FIG. 3;

FIGS. 10a, 10b and 10c are a front view, a section taken along the line Xb—Xb shown in FIG. 10a and a section taken along the line Xc—Xc shown in FIG. 10a of a modification of detector unit;

FIGS. 11a, 11b and 11c are a front view, a section taken along the line XIb—XIb shown in FIG. 11a and a section taken along the line XIc—XIc shown in FIG. 11a of another modification of detector unit;

DESCRIPTION OF PREFERRED EMBODIMENTS

Figure 1:
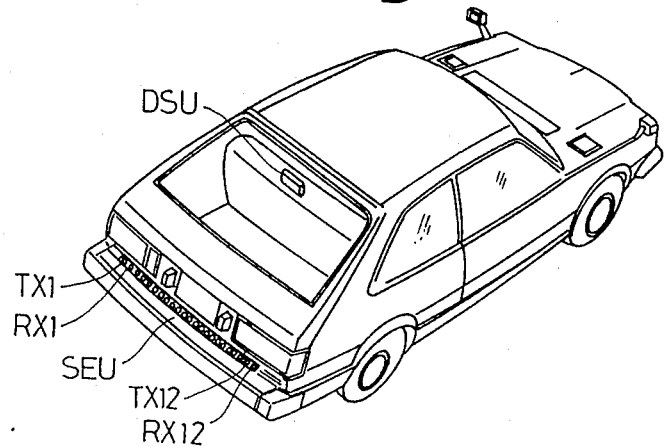
FIG. 1 is a perspective view showing the appearance of an automobile on which the apparatus of the invention is mounted.

Referring to the drawings, several embodiments of the invention will be described. FIG. 1 shows an automobile on which a reflection object detecting apparatus of the invention is mounted. Specifically, a detector unit SEU is disposed horizontally on the automobile at a location slightly above a rear bumper, with its sensitive surface facing rearward of the automobile. The detector unit SEU comprises a plurality of ultrasonic transmitters TX1 to TX12 and ultrasonic receivers RX1 to RX12 disposed in alternate fashion with each other, the number being twelve in this example. The detector unit SEU is constructed as three mechanically separate assemblies, each of which includes four ultrasonic transmitters and four ultrasonic receivers. In the example shown, a display unit DSU is disposed on the top of a rear seat.

The detector unit SEU is partially illustrated in FIGS. 2a, 2b and 2c, it being understood that portion not shown is constructed in the similar manner as the part shown. It will be noted that the ultrasonic transmitters TX1, TX2 . . . and ultrasonic receivers RX1, RX2 . . . are disposed in an alternate fashion. It is to be noted that reference numeral 1 represents a transmitting element while reference numeral 2 represents a receiving element, both of which comprises a piezoelectric element. The transmitting element 1 of each of the ultrasonic transmitters TX1, TX2 is secured to and supported by a metal diaphragm 3 while the receiving element 2 of each of the ultrasonic receivers RX1, RX2 . . . is secured to and supported by a metal diaphragm 4. It will be seen that the diaphragms 3 and 4 are comb-shaped and their active areas are staggered with respect to each other. The diaphragms 3 and 4 are separated from each other by providing a small clearance therebetween. The detector unit SEU has a casing defined by a pair of metallic members 5, 6 and in which a spacer 9 formed of a resin is disposed. A pair of buffer members 7, 8, formed of rubber, are interposed between the diaphragms 3, 4 and the metallic members 5 or 6 and the spacer 9, respectively, thereby supporting the diaphragms. A space of a relatively large size is left around each of the oscillating and the receiving element 1, 2. A printed circuit board 10 having a conductor pattern, not shown, formed thereon is secured to part of the spacer 9. A lead wire 12 is connected to each of the transmitting or receiving elements 1 or 2, and is electrically connected to a respective terminal 14 in a connector 13, which is mounted on the end of the detector unit SEU, through the conductor pattern. It will be noted that a plate-shaped magnet 11 is secured to the back of the casing (5, 6) for mounting the detector unit SEU on the body of the automobile.

FIG. 3 illustrates a general arrangement of the electrical circuit of the object detecting apparatus shown in FIG. 1 which is to be mounted on the automobile. In FIG. 3, the electrical circuit includes a microcomputer CPU, a drive circuit SDV, a plurality of transmitter switching circuits SA1, SA2 and SA3, a plurality of receiver switching circuits SB1, SB2 and SB3, the detector unit SEU, a plurality of step-up transformers T1, T2 and T3, a plurality of decision circuits DS1, DS2 and DS3, an input circuit INU, an external counter CNT, a display driver circuit DDV and a display unit DSU.

It will be understood that the transmitter switching circuits SA1 to SA3 and the receiver switching circuits SB1 to SB3 are associated with eight elements of the detector unit SEU including the four transmitters and the four receivers, or with each assembly having a casing which is mechanically separate from the casing of another assembly. An output line OUT from each of the switching circuits SA1, SA2 and SA3 is connected to the transmitters TX1 to TX4, TX5 to TX8, and TX9 to TX12, respectively, while an input line IN to each of the switching circuits SB1, SB2 and SB3 is connected to the receivers RX1 to RX4, RX5 to RX8, and RX9 to RX12, respectively.

The three transmitter switching circuits SA1 to SA3 are connected to a control line SELO in parallel while the three receiver switching circuits SB1 to SB3 are connected to a control line SELI in parallel. A control line CS1 from an output port P13 of the microcomputer CPU is connected to the input terminal of the drive circuit SDV having three output lines CSIa, CSIb and CSIc, which are connected to the respective input terminal of the switching circuits SA1, SA2 and SA3, respectively, through the step-up transformers T1, T2 and T3, respectively. Individual output lines from the switching circuits SB1, SB2 and SB3 are connected to the analog signal input terminal AIN of the respective decision circuits DS1, DS2 and DS3, respectively. Each of these decision circuits has a digital signal output terminal DOUT which is connected to input terminals SD1, SD2 and SD3 of the input circuit INU. A gain control line CG connected to output ports P14 to P16 of the microcomputer CPU is connected to control terminals of the three decision circuits DS1, DS2 and DS3 in common.

The display unit DSU includes twenty-three light emitting diode indicators LE1 to LE23 and a three digit 7-segment numerical display NDS for displaying information which is output from the microcomputer CPU. Specifically, the indicators LE1 to LE23 is utilized to represent the location of an object while the numerical display DS is used to display the distance to the object.

Figure 4:
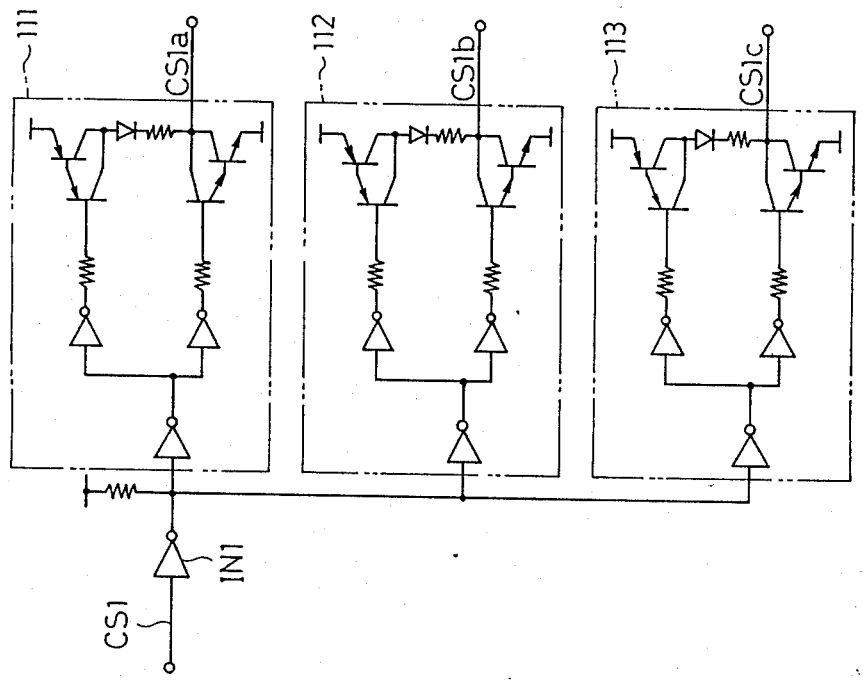

FIG. 4 shows a specific arrangement of the drive circuit SDV shown in FIG. 3. The circuit includes three driver units 111, 112 and 113 and an inverter IN1, Each driver unit comprises a complementary circuit. A signal on the control line CS1 is applied through the inverter IN1 to the input of the respective driver unit 111 to 113 in common. Accordingly, a signal which is analogous to the signal on the control line SC1 appear on the three output lines CS1a, CS1b and CS1c. A pulse signal having a frequency of about 40 kHz is applied to the control line CS1 for energizing a ultrasonic transmitter.

Figure 5:
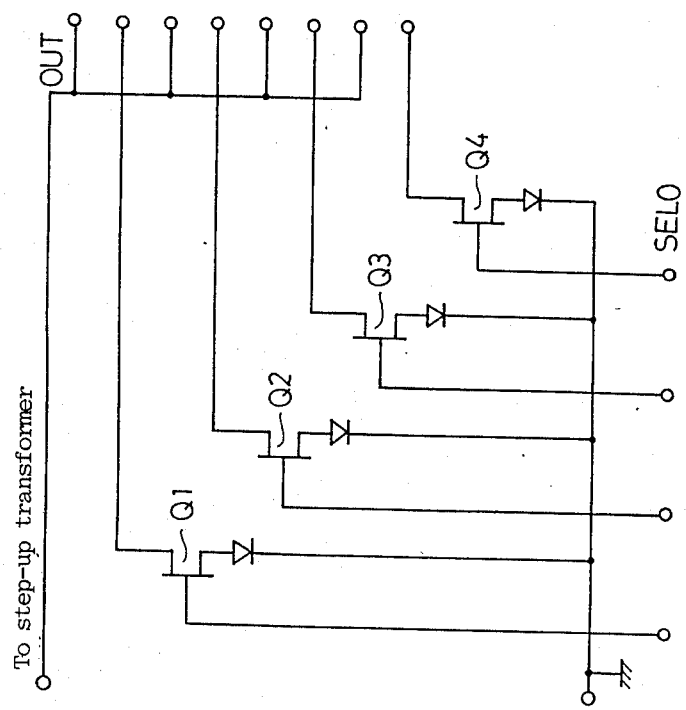
FIGS. 4, 5, 6, 7 and 8 are circuit diagrams of a drive circuit, switching circuits, an input circuit and decision circuit.

FIG. 5 shows a specific arrangement of the switching circuit SA1 shown in FIG. 3. It should be understood that the switching circuit SA2 and SA3 are constructed in an identical manner with the switching circuit SA1. As shown, the switching circuit includes four field effect transistors Q1, Q2, Q3 and Q4. Each of the transistors Q1 to Q4 has its drain connected to an output terminal OUT, its gate connected to the control line SEL0 and its source connected to the ground through a protection diode. The signal fed to the step-up transformer is connected to four output terminals OUT in common.

Four ultrasonic transmitting elements are connected to the set of four output terminals OUT, so that when a given signal is applied to the control line SEL0, the transistors Q1 to Q4 can be selectively turned on or off, thus selectively energizing the four ultrasonic transmitting elements.

Figure 6:
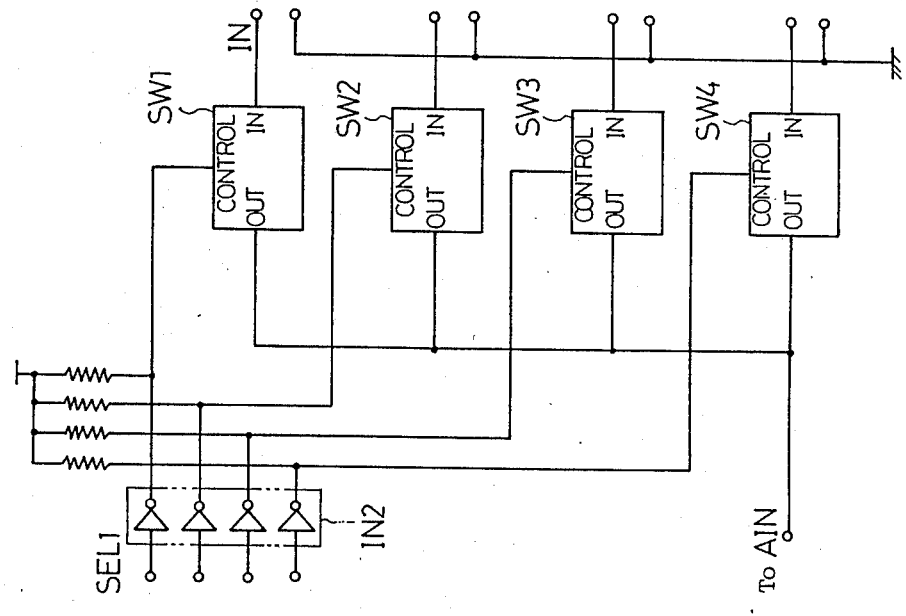

FIG. 6 shows a specific arrangement of the switching circuit SB1 shown in FIG. 3, it being understood that the remaining switching circuits SB2 and SB3 are arranged in an identical manner. As shown, the switching circuit SB1 includes four analog switches SW1, SW2, SW3 and SW4 and an inverter IN2. Four sets of input lines are connected in a similar manner, namely, one of the input lines being connected to the ground while the other is connected to the input terminal IN of each analog switch SW1, SW2, SW3 or SW4. As shown, the analog switches SW1 to SW4 have their output terminals OUT connected in common. Each of the analog switches has a control terminal CONTROL which is connected through the inverter IN2 to the control line SEL1. Thus, when a given signal is applied to the control line SEL1, the analog switches can be turned on or off, thereby allowing the signals conveyed on the four sets of the input lines IN to be selectively output from the switches.

Figure 7:
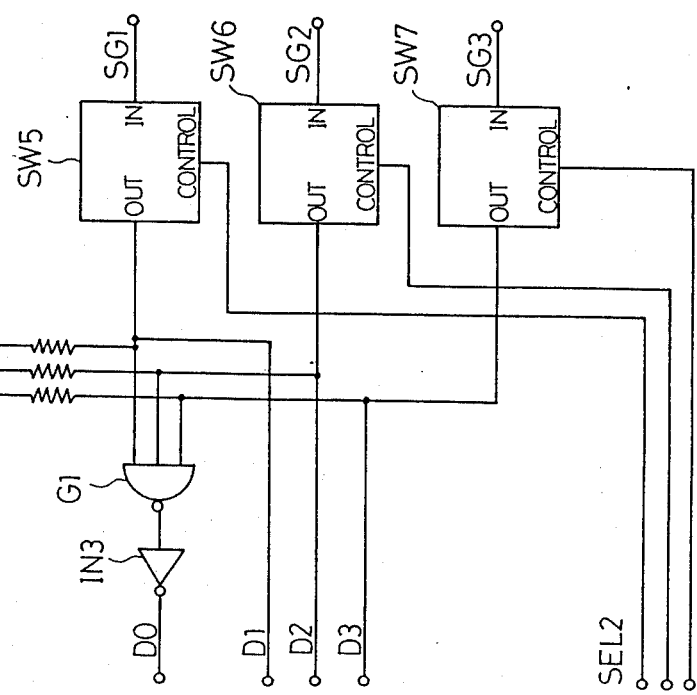

FIG. 7 shows a specific arrangement of the input circuit INU. As shown, the input circuit includes three analog switches SW5, SW6 and SW7, and an inverter IN3 and NAND gate G1. Each of the analog switches have their output terminals OUT connected to output lines D1, D2 and D3, respectively, and also feed respective inputs of the gate G1. Their control terminals CONTROL's are connected to the control line SEL2. The output terminal of the gate G1 is connected to an output line D0 through the inverter IN3.

Figure 8:
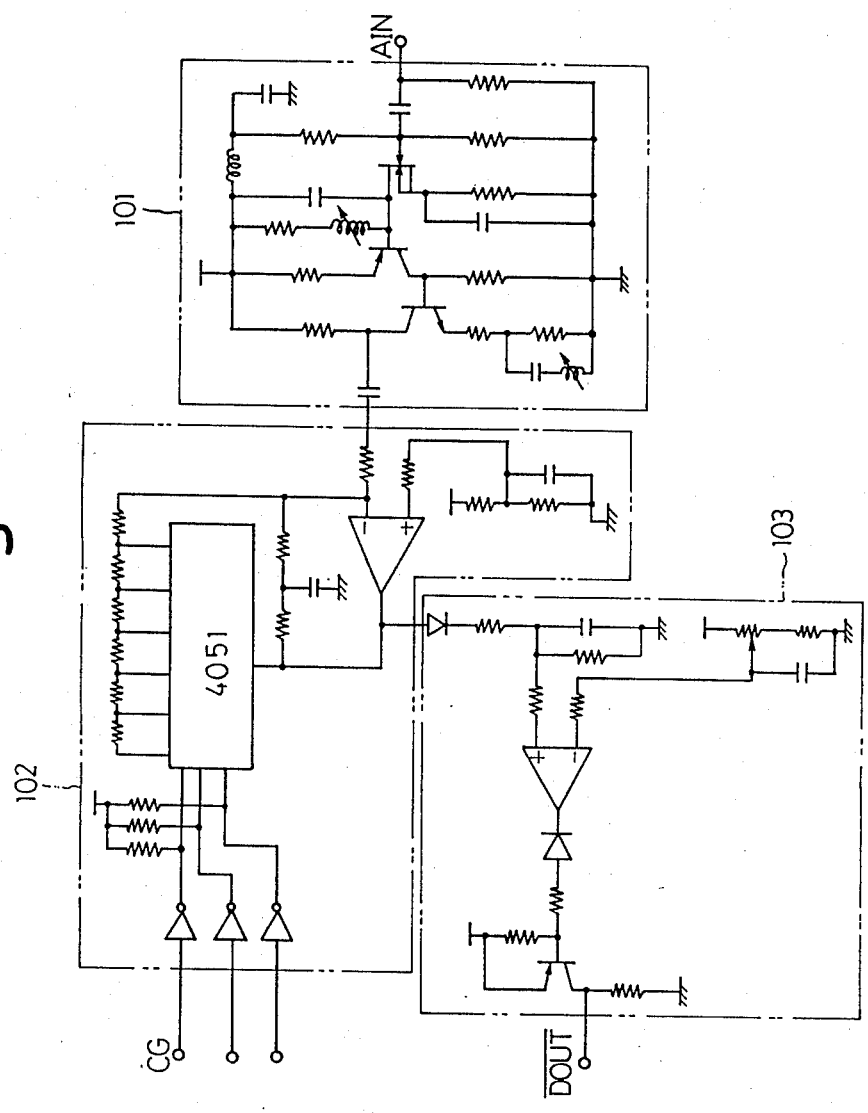

FIG. 8 shows a specific arrangement of the decision circuit DS1 shown in FIG. 3. It is to be understood that the decision circuits DS2 and DS3 are constructed in an identical manner. Referring to FIG. 8, the decision circuit DS1 comprises a narrow band amplifier 101, a programmable gain amplifier 102 and a signal level decision circuit 103.

The narrow band amplifier 101 is designed to amplify signals having frequencies around 40 kHz selectively while removing noise components. The programmable gain amplifier 102 comprises an operational amplifier, an analog multiplexer and resistors which determine the amplification factor so that eight levels of amplification can be established depending on the signal whichis applied to the three bit control line CG. The level decision circuit 103 comprises a rectifier diode, an analog comparator including an operational amplifier, a reference level generator and a buffer, and operates to deliver a binary signal as an output which depends on the output level from the programmable gain amplifier 102 relative to the level that is established by the reference level generator. In the example shown, the level obtained at an output terminal $\overline{\text{DOUT}}$ is normally high (hereafter indicated as H level), but changes to a low level L when an object to be detected exists and a reflected ultrasonic wave which is received exceeds a given level. Thus, the signal is low active.

Referring to FIG. 7 again, since the signal applied to the input terminals SG1, SG2 and SG3 from the level decision circuit is low active, it will be seen that a signal which is obtained at the output line D0 of the input circuit INU represents a logical sum (OR) of the output signals from the three decision circuit DS1, DS2 and DS3. In other words, whenever any one of the three decision circuits DS1 to DS3 delivers an L level, indicating the existence of an object, a low level L appears at the output line D0.

FIGS. 9a to 9g are flowcharts illustrating the operation of the microcomputer CPU shown in FIG. 3. The general operation will be described first with reference to FIG. 9a. When the power is turned on, an initialization subroutine is executed to initialize various parts of the apparatus. Then follows a sequential detection subroutine, a minumum calculation subroutine and a display subroutine, and the program repeatedly passes through a loop defined by these subroutines.

Generally speaking, the sequential detection subroutine selects three sets of detectors (transmitters and receivers) simultaneously for purpose of measurement, and then sequentially shifts the location of the detectors selected when repeating the measurement. When the existence of an object is detected, data representing the distance obtained is entered in a memory which corresponds to the location of the selected detector. The minimum calculation subroutine searches for data representing the minimum distance among the memories. The display subroutine displays information which is obtained as a result of the search effected in the minimum calculation subroutine.

Figure 9B:
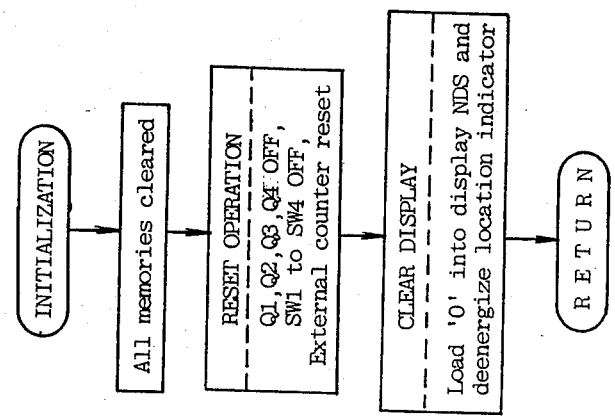
Figure 9A:
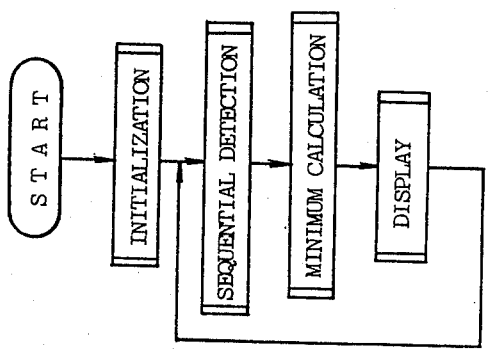

The initialization subroutine will be described with reference to FIG. 9b. Initially, memories which are used to store data, registers and flags are cleared to their initial values. The operating condition within the apparatus is reset. Specifically, the transistors Q1 to Q4 are turned off, the analog switches SW1 to SW4 are turned off and the external counter is reset. The display unit is then initialized so that the numerical display NDS indicates 0 while the indicators LE1 to LE23 are all deenergized.

Referring to FIG. 9c, the sequential detection subroutine will be described. Various registers and flags are initially reset. Specifically, the value of a leading address for a data memory is loaded into a register R1, "1" is loaded into registers R2 and R4, and "0" is loaded into flag X1. The registers and flag used in this subroutine are as follows:

R1 . . . retains reference information for a memory address at which a result of measurement is to be stored.

R2 . . . an 8 bit memory containing information relating to which oscillating element is to be selected, the content of the memory being output on the control line SELO.

R4 . . . an 8 bit memory containing information relating to which receiving element is to be selected, the content of the memory being output on the control line SELI.

X1 . . . a flag indicating whether the detector being selected represents the last detector.

A distance detection subroutine is executed, by transmitting a ultrasonic wave actually in a manner to be described later, and the presence or absence of any reflected wave and the distance to an object is determined. It will be understood that the transmitters being selected correspond to those three transmitters which are determined by the content of the register R2. For example, if R2 is equal to 1, the selected transmitters are TX1, TX5 and TX9. Similarly, the receivers selected correspond to the content of the register R4. For example, if R4 is equal to 1, the registers selected are RX1, RX5 and RX9.

Upon completing the measurement of the distance, the content of the register R2 is compared against the content of the register R4. Initially, the both registers have an equal content and because the register R4 does not contain a content of 8, the content of the register R2 is shifted by one bit toward the most significant bit. Thus, if R2 is equal to 1, 2 or 4, its content is updated to 2, 4 or 8, respectively. The register R1 is incremented by one, and then the distance detection subroutine is executed again.

Since the content of the register R2 has been updated as a result of the described processing, the transmitters which are selected during the second pass of the distance detection subroutine are switched to TX2, TX6 and TX10. Thus, the receivers remain unchanged from the previous pass while the transmitters selected are shifted by one element to the right, as viewed in FIG. 2a. Accordingly, the location of the detectors used shifts by one pitch of the assembly comprising an adjacent pair of oscillator and receiver. Since the content of the register R2 has been updated, the comparison between the registers R2 and R4 results in an inequality. Thus, the content of the register R4 is shifted by one bit toward the most significant bit. For example, if R4 has a content of 1, 2 or 4, its content is updated to 2, 4 or 8. The register R1 is incremented by one, and the distance detection subroutine is executed again.

Since the register R4 has been updated, the receivers which are selected during the third pass of the distance detection subroutine are switched to RX2, RX6 and RX10. Thus, the transmitters remain unchanged from the previous pass while the receivers selected are shifted by one element to the right as viewed in FIG. 2a. This results in shifting the location of the detectors used by one pitch of the assembly comprising an adjacent pair of oscillator and receiver. Since the register R4 has been updated, the content of the register R2 coincides with the content of the register R4, and hence the content of the register R2 is now shifted, switching the transmitters selected. Subsequently, the described procedure is repeated, alternately switching the transmitters and the receivers which are selected, and executing the distance detection subroutine each time the transmitters or receivers are switched.

When both the register R2 and the register R4 has a content of 8, that is, when the right-most transmitters (TX4, TX8 and TX12) and the right-most receivers (RX4, RX8 and RX12) in each block of the detector unit SEU are selected, the register R2 is set to 1 the flag X1 is set to "1", and the register R1 is incremented by one. The subsequent execution of the distance detection subroutine takes place with the selected transmitters which are the left-most transmitters (TX1, TX5 and TX9) in each block and with selected receivers which are the right-most receivers (RX4, RX8 and RX12) in each block. In other words, each detector is defined by the right-most receiver and the left-most transmitter of adjacent blocks. It will be seen that a result of measurement which is obtained from the selected transmitter TX1 and the receiver RX12 is invalid.

Following the described procedure of repeating the distance detection subroutine, the content of the register R2 is not equal to the content of the register R4 and the flag X1 is set to "1", and accordingly, the program exists from the sequential detection subroutine. By executing the distance detection suboutine in the manner mentioned above, a result of measurement for 23 locations can be obtained.

Figure 9F:
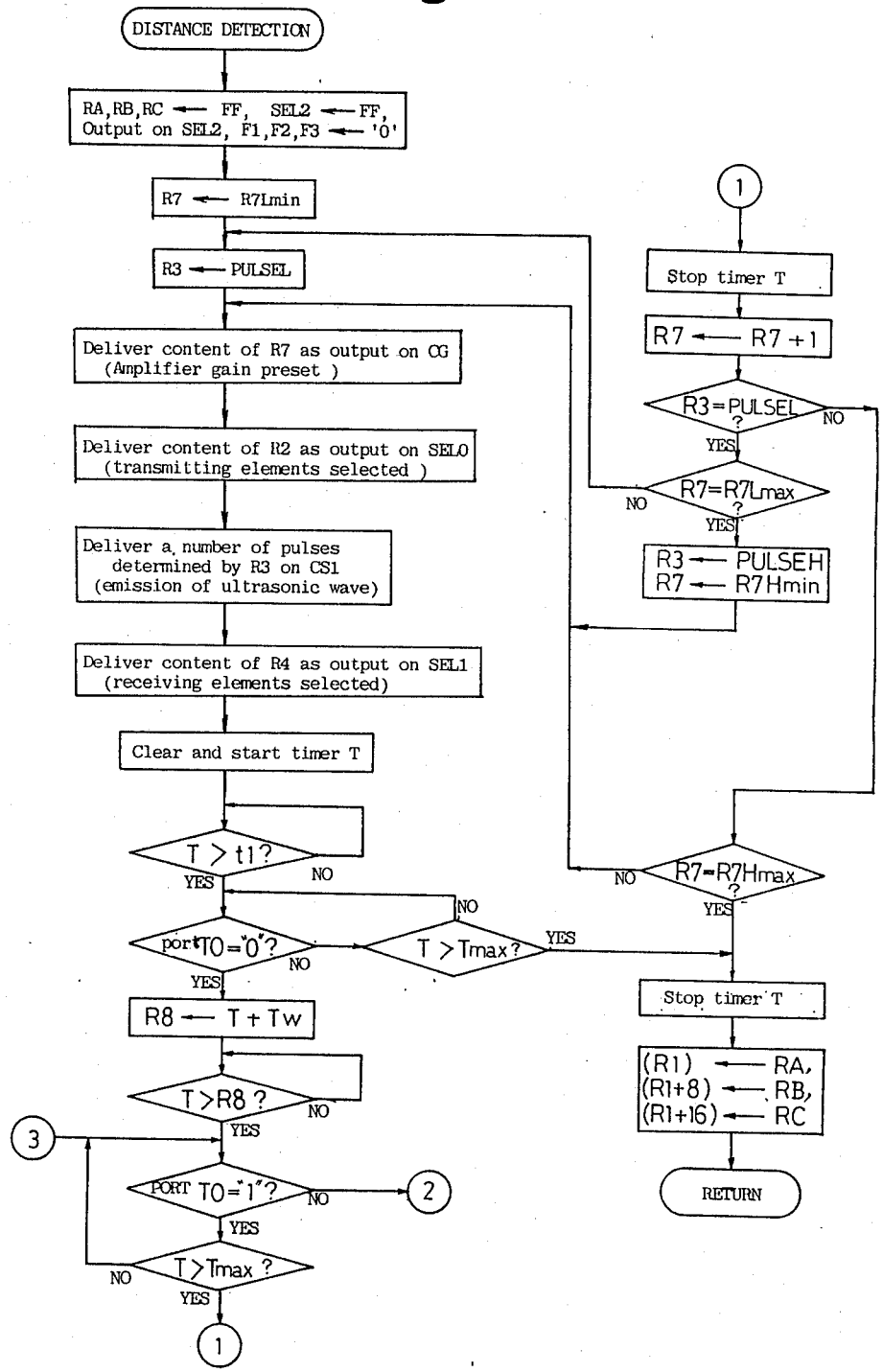
Figure 9G:
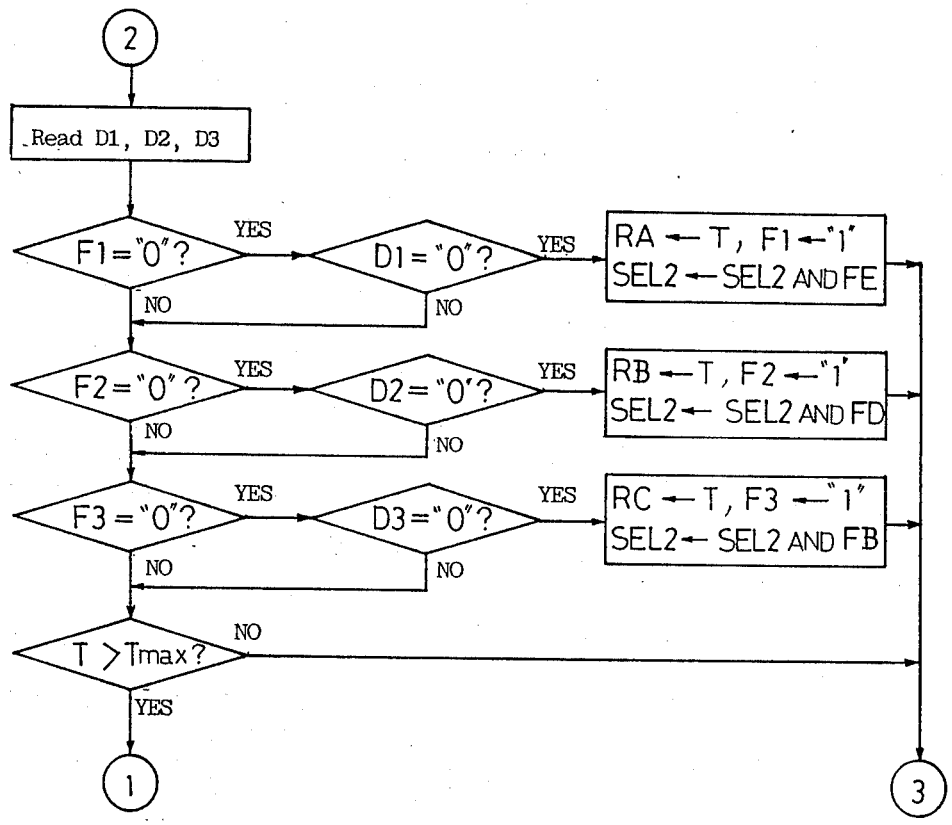

The detail of the distance detection subroutine is shown by the flowcharts of FIGS. 9f and 9g, and will now be described with reference to these Figures. In the description to follow, the following nomenclature is used in this subroutine:

RA . . . a register which stores a result of measurement obtained by using the transmitters TX1 to TX5 and the receivers RX1 to RX4.

RB . . . a register which stores a result of measurement obtained by using the transmitters TX5 to TX9 and the receivers RX5 to RX8.

RC . . . a register which stores a result of measurement obtained by using the transmitters TX9 to TX12 and the receivers RX9 to RX12.

R3 . . . a register which stores the number of pulses which are used to energize a transmitting element. (The sensitivity of detection can be changed by changing the number of pulses used for the energization.)

R7 . . . a register which stores a value representing the amplification factor of the decision circuits of DS1 to DS3.

F1, F2, F3 . . . flags indicating whether the existence of an object has been detected in each block.

T . . . timer.

PULSEL, PULSEH . . . fixed values representing two numbers of pulses which are to be loaded into the register R3.

R7Lmin–R7Lmax . . . values (0 to 5) to be loaded into the register R7 when the number of pulses is equal to PULSEL.

R7Hmin - R7Hmax . . . values (3 to 5) to be loaded into the register R7 when the number of pulses is equal to PULSEH.

t1 . . . a time interval until the influence of a direct wave reaches its maximum since the emission of an ultrasonic wave.

Tw . . . a time margin.

Tmax . . . a maximum time length (fixed value) used in the distance detection subroutine.

When this subroutine is entered, the registers and the flags are reset to their initial conditions. Specifically, the registers RA, RB and RC are loaded with a maximum value FF (in hexadecimal notation: equal to 255 in decimal notation), and FF (in hexadecimal notation) is also output on the control line SEL2. The flags F1, F2 and F3 are reset to "0".

Now, a gain 0 (R7Lmin) is loaded into the register R7 while a reduced number of pulses PULSEL is loaded into the register R3. The content of the register R7 is output on the control line CG, thus establishing the amplification factor of the decision circuits DS1 to DS3. The content of the register R2 is then output on the control line SEL0, thus determining the transmitting elements which are to be selected by the respective switching circuits SA1 to SA3. For each bit of the register R2, "1" stands for the on condition of the transistor (any one of Q1 to Q4) while "0" stands for the off condition thereof. As indicated in the sequential detection subroutine, the register R2 now has "1" in some one of bits 0, 1, 2 or 3 and has "0" for the remaining bits. In this manner, the individual switching circuits SA1 to SA3 selects one of the transmitting elements. A pulse signal having a frequency of 40 kHz is then output on the signal line CS1 for a number of pulses which is equal to the content of the register R3. This energizes the transmitting element connected to each of the switching circuits SA1 to SA3, thus three in all, allowing them to emit ultrasonic wave.

The content of the register R4 is then output on the control line SELI, thus determining the receiving elements which are to be selected by the respective switching circuits SB1 to SB3. For each bit of the register R4, "1" stands for the on condition of the analog switch (any one of SW1 to SW4) while "0" stands for the off condition thereof. As indicated in the sequential detection subroutine, the register R4 now has "1" in some one of the bits 0, 1, 2 and 3 and "0" for the remaining bits. Accordingly, the respective switching circuits SB1 to SB3 select one of the receiving elements.

The timer T is then cleared and caused to start. The program then waits for a count in the timer T to reach a given time interval t1, whereupon the status at an input port T0 (the output D0 of the input circuit INU) is examined. As mentioned previously, the L condition at this signal line (which is equivalent to "0") indicates that at least one of the decision circuits DS1 to DS3 has detected the ultrasonic wave while the H condition (equivalent to "1") indicates that none of the decision circuits DS1 to DS3 has detected the ultrasonic wave.

It will be understood that for a given time internal which immediately follows the emission of an ultrasonic wave, there generally occur various influences of a direct wave on the receiving side which may be caused by an electromagnetic induction between the signal lines of the transmitting and the receiving side, the diffraction of the ultrasonic wave, mechanical oscillations which are transmitted through a support member of the detector, or the like. Such influences will be at maximum when the time interval t1 has passed, and if the existence of an object is not detected, there may appear "0" at the input port T0. For this reason, the program waits for the influences of direct wave being removed or until the port T0 resumes "1". Where the level of the direct wave include oscillations, the port T0 may change to "0" again after it has once resumed "1". To cope with this problem, the count T in a timer which prevails when the port T0 resumes "1" is derived, and is added with a given time margin Tw, and the sum is loaded into the register R8. The program then waits for the count in the timer T to exceed the content of the register R8 or until the waiting time Tw passes.

When the time Tw has passed, the actual detection is initiated. The status at the input port T0 is examined until the time reaches Tmax. When the input port T0 assumes "0", thus a level indicating the detection of the existence of an object, the levels at the output lines D1, D2 and D3 of the input circuit INU are read. The flags F1, F2 and F3 are initially reset to "0". Accordingly, when the existence of an object is detected for the first time, a determination is made to see if D1 is equal to "0". If it is, the prevailing count of the timer T is stored in the register RA, the flag F1 is set to "1", indicating that the detection has been recognized, and the register which is allocated to storing data that is output on the signal line SEL2 is updated by calculating a logical product (AND) of its content and FF in hexadecimal notation. The bit 0 on the control line SEL2 is reset to the low level L. When the bit 0 on the control line SEL2 is reset, the analog switch SW5 in the input circuit INU is turned off, thus preventing subsequent signal SG1 from influencing upon the output lines D0 and D1.

If the signal line D1 has "1", another signal line D2 is examined. If it also has "1", a further signal line D3 is examined. If D2 has "0", the count in the timer T is stored in the register RB, the flag F2 is set to "1", and the register which is allocated to storing data output on the control line SEL2 is updated by calculating a logical product of its content with FD in hexadecimal notation. Bit 1 on the control line SEL2 is reset to its low level L. When the bit 1 on the control line SEL2 is reset, the analog switch SW6 in the input circuit INU is turned off, thereby preventing subsequent signal SG2 from influencing upon the output lines D0 and D2.

If D3 has "0", the count in the timer T is stored in the register RC, the flag F3 is set to "1", and the register which is allocated to storing data output on the control line SEL2 is updated by calculating a logical product of its content with FB in hexadecimal notation. Bit 2 on the control line SEL2 is reset to its low level L. When bit 2 of the control line SEL2 is reset, the analog switch SW7 in the input circuit INU is turned off, thereby preventing subsequent signal SG3 from influencing upon the output lines D0 and D3.

The described examination is repeated until the time reaches Tmax. However, once each of the output lines D0, D1 or D2 obtains the detection level "0", the flag F1, F2 or F3 which corresponds to that bit is set to "1", indicating that the detection has been recognized, so that the examination for that bit is skipped over. Accordingly, as a result of the described procedure, the earliest time that the detection level for an object is delivered since the ultrasonic wave has been transmitted, excluding the time or times when the direct wave is detected, are stored in the registers RA, RB and RC. Obviously, if the object detection level is not delivered until the timer T reaches Tmax, the content of the registers RA, RB and RC remain to be equal to the maximum value FF which has been initially loaded.

When the count in the timer T reaches Tmax, the timer T is stopped and the register R7 is incremented by one. If the number of pulses which is then stored in the register R3 represents the smaller value PULSEL, the updated content of the register R7 is compared against R7Lmax (5). If they are not equal, the described procedure is repeated again. Since the register R7 is updated now, the sensitivity of detection is one step higher than the previous pass.

The register R7 is incremented by one each time the timer count reaches Tmax, thus updating the sensitivity of detection. When the updated value in the register R7 reaches R7Lmax (5), the larger number of pulses PULSEH is loaded into the register R8 while the fixed value R7Hmin is loaded into the register R7, and the described procedure is repeated. Subsequently, when the content of the register R7 is to be updated next, the content of the register R7 is compared against R7Hmax since the register R3 now stores the larger number of pulses PULSEH. If no coincidence is reached, the described procedure is repeated. Upon coincidence, the timer T is stopped, and the content of the respective registers RA, RB and RC are stored in the data memory at addresses equal to R1, R1+8 and R1+16, respectively.

The detecting procedure is repeated until the content in the register R7 reaches R7Hmax only when no object exists within any region which can be detected by the three blocks. In other words, when the object detection level "0" appears on the output lines D1, D2 and D3, bits 0, 1 and 2 on the control line SEL2 are reset, so that when all of these bits are reset, there is no subsequent occurrence that the output line D0 has "0".

If the output line D0 continues to be at "1", this means that the input port T0 remains at its "1" status when the value in the timer T has exceeded t1 after the ultrasonic wave has been transmitted and the timer T has been cleared and started. Accordingly, when the count in the timer T exceeds Tmax under this condition, the timer T is stopped immediately, and the content of the registers RA, RB and RC are stored in the data memory, thus exiting from the distance detection subroutine.

The minimum value calculation subroutine will now be described with reference to FIG. 9d. The following nomenclature is used in this subroutine.

R1 . . . a register which stores a leading or starting address of the data memory.

R5 . . . a register which stores an offset value of the address of the memory which is referenced to R1.

R6 . . . a register which stores the location having the minimum distance detected up to that time.

PQ . . . a register which stores a minimum value of data.

CQ . . . a register in which data is stored during a current pass.

In this subroutine, the leading address of the data memory is initially loaded into the register R1, and the content of the memory at an address determined by the value stored in the register R1 is loaded into the register PQ, and the register R5 is set to 0 while the register R6 is set to 1. A subsequent processing takes place in a loop form.

Initially, the register R5 is incremented by one, and its content is compared against 23. If it is not equal to 23, the sum of the content of the registers R1 and R5 provide an address, at which the stored content of the data memory is read and stored in the register CQ. The content of the register PQ is compared against the register CQ, and if CQ>PQ, the content of the transistor CQ is transferred to the register PQ, and a value representing the content of the register R5 incremented by one is stored in the register R6. This means that whenever data having a value less than the minimum value that has been referred is found, the content of the register PQ is updated to a new minimum value.

The described processing is repeated around the loop, and when the value stored in the register R5 reaches 23, or the last data has been examined, the content of the register PQ is compared against the maximum value FF in hexadecimal notation of 255 in decimal notation. Thus, if no object is detected at any location, the maximum value FF which has been initially loaded remains within the register PQ, and hence the content of the register R6 is reset to 0 in order to indicate a failure of detecting the existence of an object. When the described processing has been completed, the program exits from the minimum value calculation subroutine.

The display subroutine will now be described with reference to FIG. 9e. In this subroutine, the content of the register PQ is initially compared against the maximum value FF. If the content of the register PQ is equal to the maximum value FF, indicating that no object has been detected, the register PQ is reset to 0. Alternatively, if the existence of an object is detected, the content of the register PQ is converted into a decimal value. The content of the register PQ or the distance to the object detected is displayed by the numerical display NDS while also activating the location indicator in accordance with the content of the register R6, by energizing one of the twenty-three light emitting diodes LE1 to LE23. It is to be understood that positions 1 to 23 within the register R6 corresponds to these diodes LE1 to LE23. When the register R6 is reset to 0, every diode is deactivated.

FIGS. 10a, 10b and 10c show a modification of the detector unit SEU. In this modification, a single diaphragm 21 is shared by all the transmitters and all the receivers. In other respects, the arrangement is similar to the previous embodiment.

FIGS. 11a, 11b and 11c show another modification of the detector unit SEU. It will be seen that in this modification, each transmitter and each receiver is provided with an independent diaphragm $22_1$, $22_2$, $22_3$, $22_4$. . .

Figure 12A:
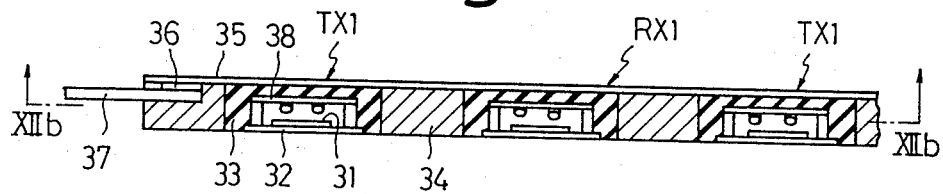
FIGS. 12a and 12b are a longitudinal section and a section taken along the line XIIb—XIIb shown in FIG. 12a of a further modification of detector unit.
Figure 12B:
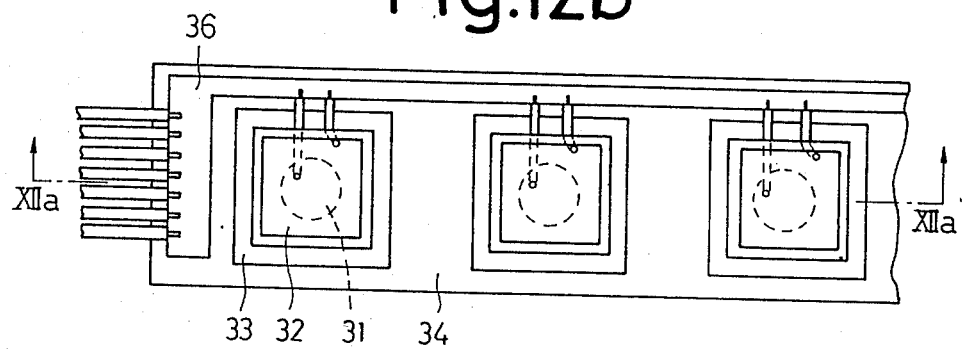

FIGS. 12a, 12b and 12c show a further modification of the detector unit SEU. In this modification, a plate-shaped support member 34 is formed with a plurality of through holes, in each of which is mounted one of the transmitters and the receivers. A transmitter comprises an integral assembly including an oscillating element 31, a diaphragm 32 and a spacer 38. A receiver comprises a similar integral assembly. Both a transmitter and a receiver are supported by the wall of the through hole formed in the support 34 with a block of silicone rubber 33 interposed therebetween. Lead wires extending from the individual transmitting and receiving elements are connected to a terminal assembly 37 through a conductor pattern formed on a printed circuit board. A permanent magnet 35 is provided to allow the detector unit SEU to be fixedly mounted on the body of an automobile.

Figure 13:
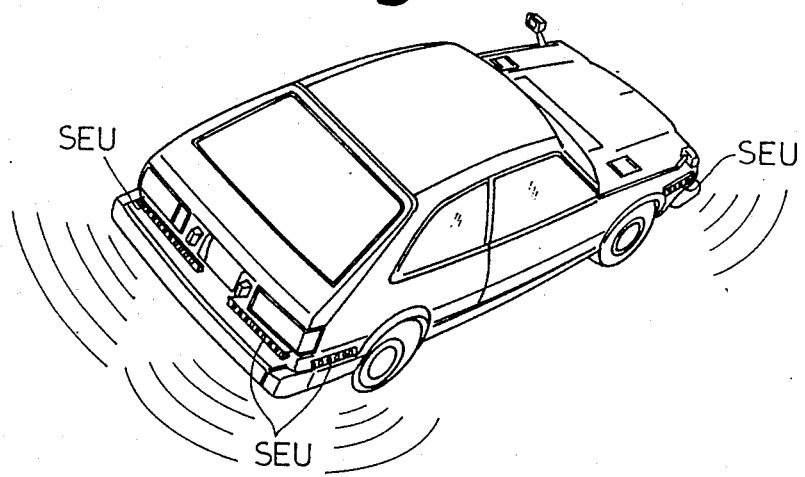
FIG. 13 is a perspective view of an automobile on which the detector unit of the modification is mounted.

In the described embodiments, a plurality of ultrasonic transmitters and ultrasonic receivers are disposed as a continuous linear array on the rear of an automobile. However, as illustrated in FIG. 13, a plurality of detector units may be disposed at diverse locations which are separate from each other. In this instance, a detector comprising a single ultrasonic transmitter and an ultrasonic receiver may be disposed at each location. Where various detectors are disposed at diverse locations around the car body, it is desirable that the display unit be defined with a visible pattern in the form of a car body, with position indicators such as light emitting diodes disposed at locations on the pattern which corresponds to the locations of the various detectors.

In the embodiments described above, a plurality of ultrasonic detectors are used and are sequentially selected to enable the detection of an object at each location. This permits an area over which a detection is possible to be extended by providing a number of detectors, and also enhances the accuracy of measuring the distance. Since an electrical scanning is employed, the entire area can be monitored within a reduced time, allowing its use in applications such as on automobiles where a real operation is required.

Figure 14A:
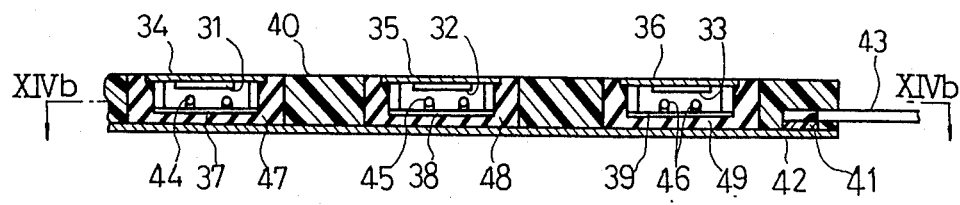
FIGS. 14a and 14b are a longitudinal section and a section taken along the line XIVb—XIVb shown in FIG. 14a of still another modification of detecting unit.
Figure 14B:
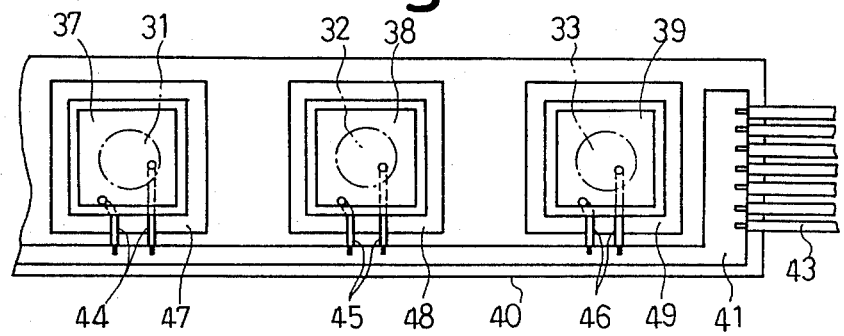
Figure 16:
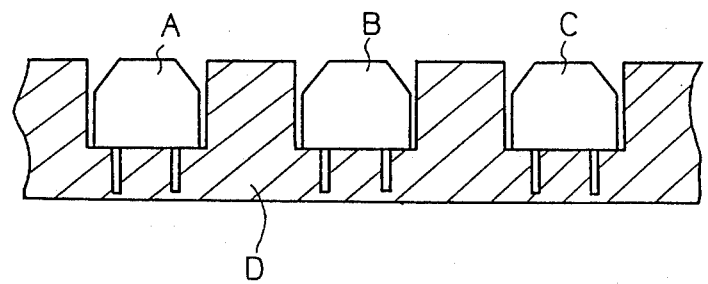
FIG. 16 is a longitudinal section of one form of detector unit which is constructed with conventional ultrasonic elements.

FIG. 14a shows still another modification of detector unit SEU in longitudinal section and FIG. 14b shows the modification in a cross section taken along the line XIVb—XIVb shown in FIG. 14a. These Figures show ultrasonic transmitting elements 31, 33 and ultrasonic receiving element 32. It is to be noted that these Figures show only part of the detector unit, but that in actuality, four of such ultrasonic transmitting and receiving elements are disposed in alternate fashion. The elements 31, 32 and 33 are secured to metallic diaphragms 34, 35 and 36, respectively, having a square form, the marginal edges of which are integrally attached with spacers 37, 38, 39, respectively, thereby defining a relatively large spaces between the spacers and diaphragms.

A substrate 40 formed of resin is provided with eight square-shaped through holes which are larger than the diaphragm 31, spacer 37 or the like. An assembly including each ultrasonic transmitting or receiving element is disposed within the through opening. Silicone rubbers 47, 48 and 49 fill the space between each assembly and the internal wall of each through hole. In this manner, the assembly is supported by the substrate 40 with the silicone rubber interposed therebetween. In the example shown, the silicone rubber extends below the spacers 37, 38 and 39, but such portion of the silicone rubber can be dispensed with.

A printed circuit board is shown at 41, and extends laterally of each assembly or in a direction perpendicular to the direction of oscillations and offset therefrom. While not shown, a plurality of conductor patterns are printed on the board 41, and are connected with lead wires 44, 45, 46 which are electrically connected with the electrodes of the transmitting and the receiving elements 31, 32 and 33 and which are taken out therefrom in a lateral direction. A lead wire 43 is connected to each conductor pattern on the circuit board 41. The junction of the lead wire 43 is fixed by molding. A metallic back plate 42 is adhesively bonded to the back surface of the substrate 40.

Figure 15:
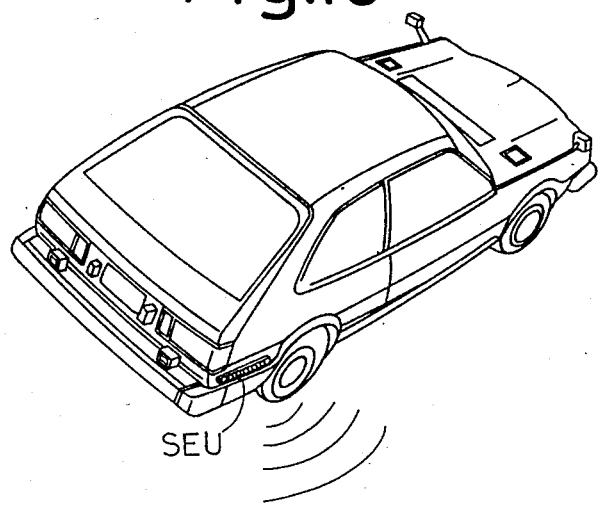
FIG. 15 is a perspective view of an automobile having the detector unit of the modification mounted thereon.

FIG. 15 illustrates an actual mounting of the ultrasonic apparatus. In this example, the ultrasonic detector unit SEU is mounted on a molding which is located on one lateral side of an automobile toward the rear end thereof. It will be apparent from the comparison of FIGS. 14a and 15, that the reduced thickness of the detector unit SEU itself prevents any irregularity from occuring in the appearance of the automobile when the unit is so mounted. Such mounting will be convenient when driving an automobile back into a garage while changing its direction.

From the foregoing, it will be understood that the invention provides an ultrasonic detector unit of a reduced thickness which can be extensively used as an obstacle detecting apparatus mounted on an automobile.

What is claimed is:

1. A reflective object detecting apparatus comprising:
object detector means including at least three ultrasonic wave generating means and at least three ultrasonic receiving means disposed in a linear array substantially at equal intervals and in alternate relation;
means for energizing the ultrasonic wave generating means;
amplifier means having input and output means for amplifying a signal from the ultrasonic receiving means;
selection means connected to at least one of the input and output means of the amplifier means for simultaneously selecting signals from at least two of the ultrasonic receiving means;
energization selection means connected to the ultrasonic wave generating means for selective energizing simultaneously at least two of the ultrasonic wave generating means;
display means for displaying information relating to the location of and a distance to an object;
and control means for controlling the selection means and the energization selection means, for alternately changing the particular ultrasonic receiving means being selected and changing the particular ultrasonic generating means being selected and for sequentially monitoring signals from the plurality of ultrasonic receiving means in a selective manner so that when a signal exceeds a given level, the control means causes the display means to display information relating to the distance which corresponds to the time of reception from the energization of the ultrasonic wave generating means and also relating to the location of the object corresponds to a particular position of the ultrasonic receiving means which is then selected.

2. A reflective object detecting apparatus according to claim 1 in which each ultrasonic receiving means is provided with electric terminals electrically separated from the electric terminals of the other ultrasonic receiving means.

3. A reflective object detecting apparatus according to claim 2 in which the object detector means comprises a first diaphragm disposed in contact with a plurality of ultrasonic wave generating means and a second diaphragm disposed in contact with the plurality of ultrasonic receiving means.

4. A reflective object detecting apparatus according to claim 3 in which at least one of the first and the second diaphragm is supported by a fixing member associated with the object detector means with an elastic material interposed therebetween.

5. A reflective object detection apparatus according to claim 2 in which the object detector means includes a fixing member through which a plurality of holes are formed, each of the ultrasonic wave generating means and the ultrasonic receiving means being disposed within a through hole and supported by the fixing means with an elastic material interposed therebetween.

6. A reflective object detecting apparatus according to claim 1 in which then the existence of an object is detected at a plurality of locations, the control means causes the display means to display information relating to the location of and a distance to an object having a minimum distance.

7. A reflective object detecting apparatus according to claim 1 in which the object detector means comprises:
 a substrate in which a plurality of through holes are formed;
 at least one ultrasonic transmitting element disposed within a through hole in the substrate;
 at least one ultrasonic receiving element disposed within a through hole in the substrate;
 a first elastic supporting member which fills the space between the ultrasonic transmitting element and the wall of the through hole for supporting the ultrasonic transmitting element;
 a second elastic support member which fills the space between the ultrasonic receiving element and the wall of the through hole for supporting the ultrasonic receiving element;
 and a conductive member electrically connected to the ultrasonic transmitting elements and the ultrasonic receiving element and dispposed offset from these elements in a direction perpendicular to the direction of oscillators of the elements with each element being connected to said conductive member by separate electrical connecting means.

8. A reflective object detectiong apparatus according to claim 7 in which the conductive member comprises a printed circuit board carrying printed conductor patterns.

* * * * *